(12) United States Patent
Handa

(10) Patent No.: US 6,633,532 B1
(45) Date of Patent: Oct. 14, 2003

(54) TILT ADJUSTING APPARATUS FOR DISK DRIVE

(75) Inventor: Hiroto Handa, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 0 days.

(21) Appl. No.: 09/659,356

(22) Filed: Sep. 12, 2000

(51) Int. Cl.[7] ............................................. G11B 23/00
(52) U.S. Cl. ...................... 369/263; 369/258; 369/75.1; 369/75.2; 369/77.2
(58) Field of Search ................................ 369/263, 258, 369/75.1, 75.2, 77.2

(56) References Cited

U.S. PATENT DOCUMENTS 6,324,152 B1 * 11/2001 Eguchi et al. .............. 369/258

* cited by examiner

Primary Examiner—William Korzuch
Assistant Examiner—Mark Blouin

(57) ABSTRACT

A tilt adjusting apparatus for a disk drive including a support plate which is fixed to a drive plate, and a skew plate which is fixed to a spindle motor, wherein the support plate and the skew plate is attached to each other with guide screws. The skew plate is tiltably supported by the support plate with the use of helical compression springs. The skew plate has bulged portions which abut on gradient portions formed on support plate. The skew plate also has grooves for receiving guide pins which are fixed to the support plate. An adjuster screw applies force to the skew plate in a tangential direction which is perpendicular to the tracking direction of the optical pickup, and thus performs a tilt adjustment in the tangential direction.

3 Claims, 6 Drawing Sheets

TILT ADJUSTING APPARATUS FOR DISK DRIVE

BACKGROUND OF THE INVENTION

1. Field of the Invention

The present invention relates to a tilt adjusting apparatus employed in a disk drive which performs recording and/or playing back of optical disks. More particularly, the present invention relates to a tilt adjusting apparatus which performs an accurate adjustment in a relation between an optical axis for reading signals and a surface on which signals are recorded.

2. Description of the Related Art

Recently, disk drives which utilize optical disks such as CDs, magnetic optical disks, DVDs, etc., as information recording mediums has become increasingly popular. A typical disk drive of this type comprises: an optical pickup for reading signals by irradiating an optical disk with an optical beam; a feeding mechanism for translating the optical pickup in a radial direction of the optical disk; a turntable which carries the optical disk; a spindle motor for revolving the disk on the turntable; a loading mechanism for inserting/ejecting the optical disk; and other components including circuit elements. With such a disk drive, an angle between the optical axis of the beam radiated from the optical pickup and the signal-recorded surface of the disk must always be constant for the signals to be read accurately. The disk surface, however, tends to tilt relative to the optical axis due to the following factors. That is, mechanical factors such as a tilt in the feeding mechanism, swaying of the surface of turntable, and differences between component products, or other factors such as warp of the disk.

To compensate for this, disk drives are generally provided with tilt adjusting apparatuses to adjust the tilt of the disk surface. An exemplification of tilt adjusting apparatuses will be described below. Referring to FIG. 6, a shaft 2a of a spindle motor 2 is fixed to a turntable 1 at the center. An angle $\theta_2$ between the axis of the shaft 2a and the turntable 1 is kept right by a supporter 3.

The shaft 2a and the supporter 3 are inserted through a hole 9a formed in chassis 9 without contacting the chassis 9. On the upper side of the of the spindle motor 2, which is the side closer to the chassis 9, a mounting plate 5 is attached. Tapped holes 9b and 9c are formed in the chassis 9, while small holes 5b and 5c are formed in the mounting plate 5 at positions corresponding to the tapped holes 9b and 9c, respectively.

A fastening screw 6b is inserted through a small hole 5b and through a coil spring 8b which is sandwiched between the chassis 9 and the mounting plate 5, and is screwed into the tapped hole 9b. Meanwhile, another fastening screw 6c is inserted through a small hole 5c and through a spacer 7 which is also sandwiched between the chassis 9 and the mounting plate 5, and is screwed into the tapped hole 9c.

The operation of the above-described tilt adjusting apparatus of conventional type will be described below. By rotating the fastening screw 6b to change a depth of insertion, it is possible to cause the mounting plate 5 to swing about a fulcrum 7a on the spacer 7. This provides the tilt adjustment of the spindle motor 2 which is fixed to the mounting plate 5, and thus realizes a tilt adjustment of the disk placed on the turntable 1.

As for the tilt adjusting apparatuses of conventional type having above-described construction, the center upon which the mounting plate 5 swings to adjust a tilt is the fulcrum 7a of the spacer 7. When the tilt adjustment is performed, therefore, vertical position of the center of the turntable 1 varies. In addition, the rotational center of the turntable 1 shifts in a horizontal direction; thus, when the optical pickup utilizes, for example, three spots of one main beam and two subbeams for tracking, a difference of phases may be caused in signals of subbeams, which results in inferior play-back ability.

SUMMARY OF THE INVENTION

The present invention aims to solve the above-described problems encountered by conventional tilt adjusting apparatuses.

Accordingly, it is an object of the present invention to provide a tilt adjusting apparatus, which has a simple construction, and which is capable of making an accurate adjustment without causing a displacement of the center of the disk.

A tilt adjusting apparatus according to the present invention is applicable for a disk drive having a turntable for carrying a disk, a spindle motor for revolving the turntable, an optical pickup for reading signals recorded on the disk, and a drive plate for supporting the optical pickup. To achieve the above-described object of the present invention, a tilt adjusting apparatus according to the present invention comprises: a skew plate which is fixed to or combined with the spindle motor; a supporter unit for supporting the skew plate over the drive plate in such a manner that the skew plate is tiltable around the central point of the signal-recorded area of the disk; a first adjuster unit which has an adjuster screw for applying force to the skew plate in a first direction which is perpendicular to a tracking direction of the optical pickup, and which thereby tilts the skew plate so as to adjust a tilt of the disk on the turntable in the first direction; and restraining means for restraining the skew plate from moving in a second direction, which is a direction parallel to the tracking direction of the optical pickup.

In the above-described tilt adjusting apparatus, the adjuster screw is used for applying force to the skew plate in the first direction which is perpendicular to a tracking direction of the optical pickup. This results in a tilting of the turntable which is attached to the spindle motor in the first direction around the central point of the signal-recorded area of the disk. Accordingly, the tilt adjustment of the disk in the first direction is realized, without causing a displacement of the disk in the vertical direction. During this operation, the restraining structure restrains the skew plate from moving in the second direction which is parallel to the tracking direction of the optical pickup. The center of the disk, therefore, does not shift in the second direction when the adjuster screw applies force to the skew plate.

The supporter unit may have at least one gradient portion which slidably supports the skew plate at the bottom. The gradient portion supports the skew plate, while the skew plate slides thereon; therefore, the tilt adjustment is achievable without changing the vertical position of the center of the disk which is mounted on the turntable.

The supporter unit may also have at lease one elastic supporting member for supporting at least one of two opposing points in the skew plate, and the tilt adjusting apparatus may also have a second adjuster unit for adjusting a tilt of the disk in the second direction by applying force to the skew plate in a direction parallel to the axis of revolution of the disk.

The second adjuster described above is used for applying force to the skew plate, so that the elastic supporting member stretches or shrinks. Accordingly, the turntable which is attached to the spindle motor tilts in the second direction which is parallel to the tracking direction of the optical pickup around the central point of the signal-recorded area of the disk. This realizes the tilt adjustment of the disk in the second direction without causing a displacement of the disk in the vertical direction.

As described above, the present invention provides a tilt adjusting apparatus for a disk drive, which has a simple construction, and which realizes an accurate adjustment without causing a displacement of the center of the disk.

BRIEF DESCRIPTION OF THE DRAWINGS

FIGS. 4A, 4B, and 4C are longitudinal sectional views showing horizontal condition of the turntable relative to line T, wherein FIG. 4A shows the leveled condition and FIGS. 4B and 4C show tilted conditions;

FIGS. 5A, 5B, and 5C are longitudinal sectional views showing horizontal condition of the turntable relative to line R, wherein FIG. 4A shows the leveled condition and FIGS. 4B and 4C show tilted conditions.

DESCRIPTION OF THE PREFERRED EMBODIMENT

(1) Construction

A construction of a disk drive incorporating a tilt adjusting apparatus according to the present embodiment will be described below. As shown in FIGS. 1 to 5, a horizontal line, which is parallel to the tracking direction of an optical pickup, and which passes through the central point of a signal-recorded area of a disk, is denoted as line R. Meanwhile, horizontal and vertical lines which cross line R at right angles at the central point of the signal-recorded area of the disk are denoted as line T and line S, respectively. In descriptions hereof, "radial direction" means the direction parallel to line R, and "tangential direction" means the direction parallel to line T.

1-1. Overall Construction

Figure 1:
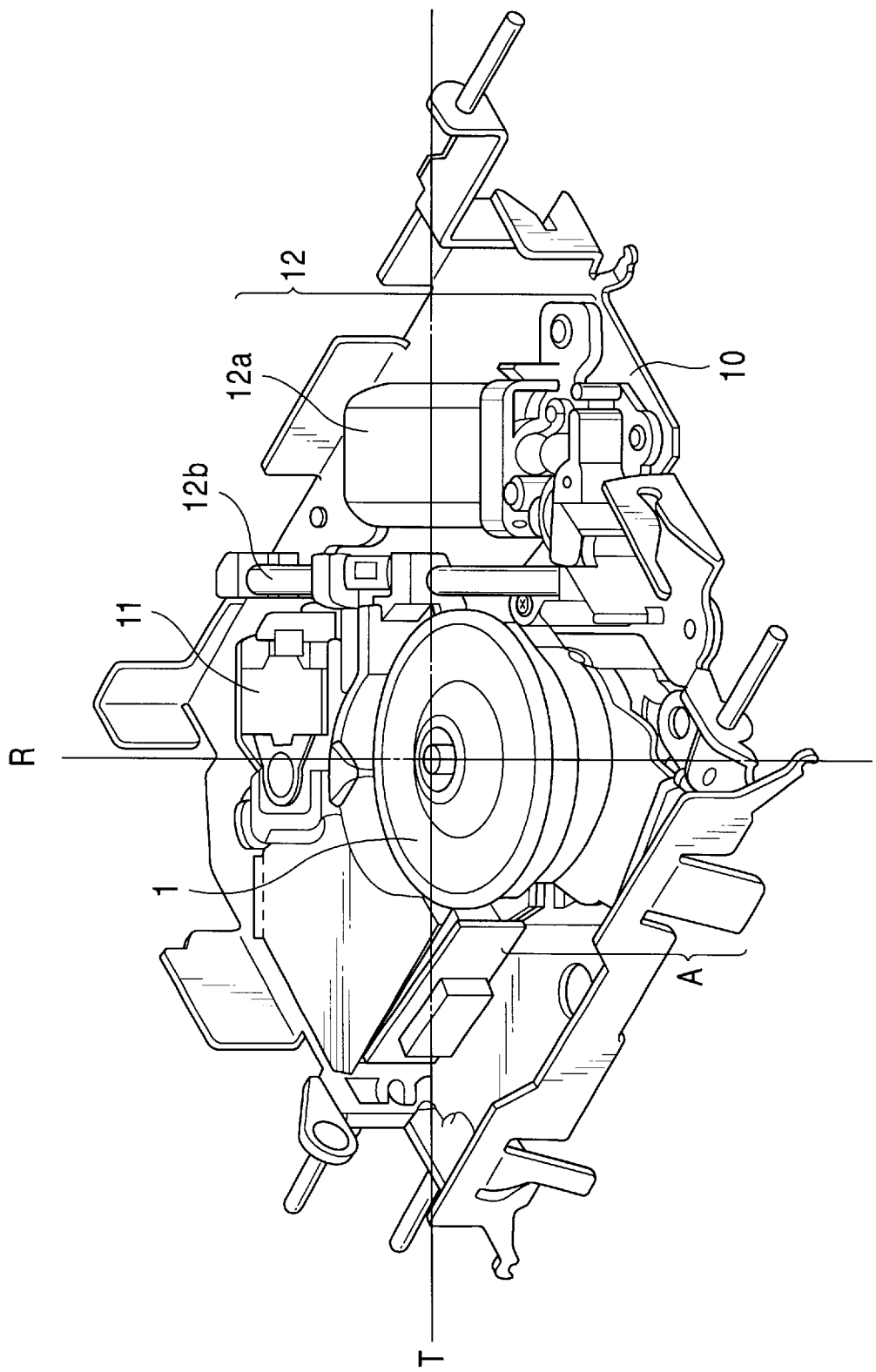
FIG. 1 is a perspective view of a disk drive incorporating a tilt adjusting apparatus according to an embodiment of the present invention.
Figure 2:
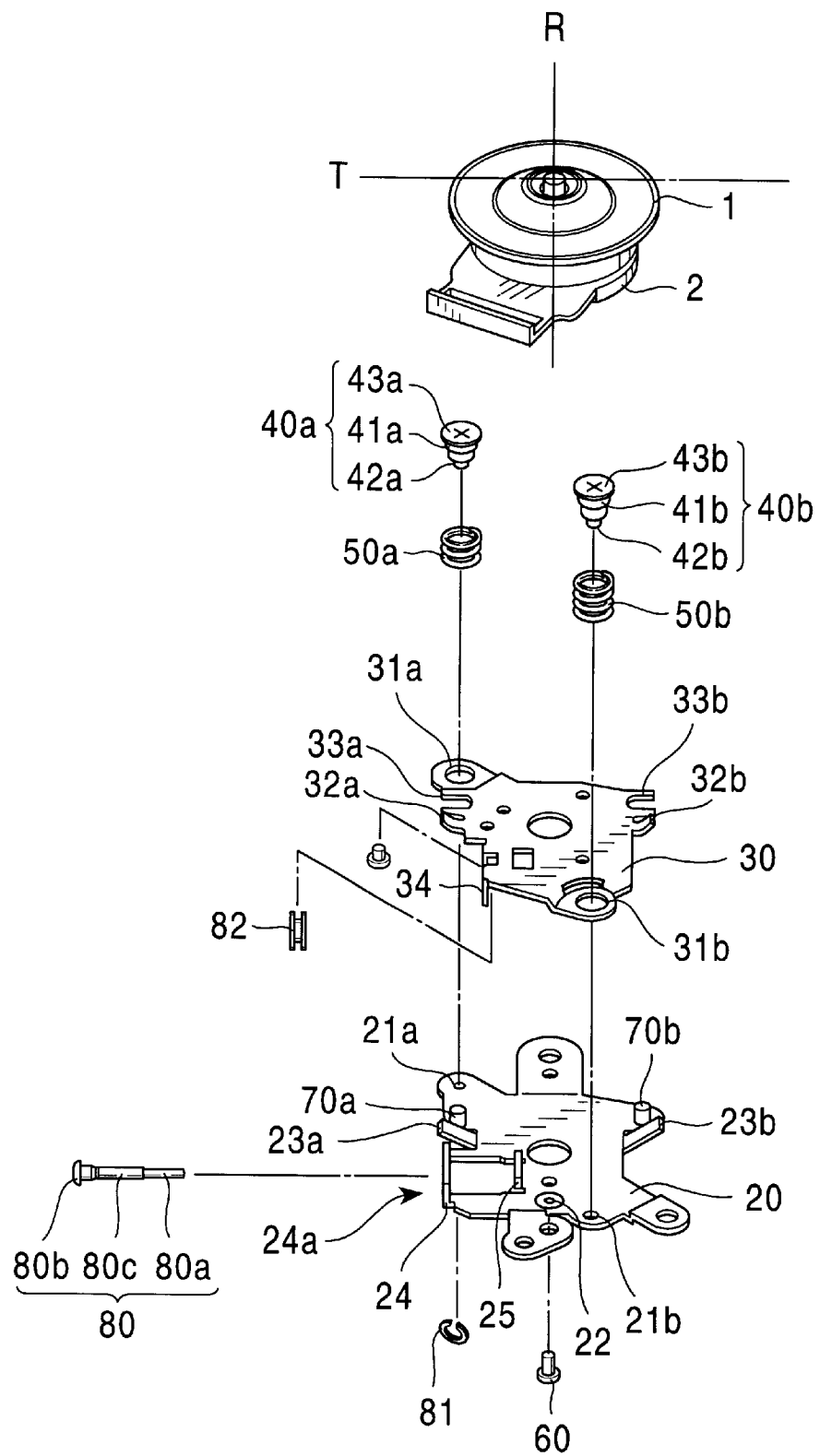
FIG. 2 is an exploded perspective view of a part of the disk drive shown in FIG. 1.

As shown in FIGS. 1 and 2, a tilt adjusting apparatus A according to the present embodiment comprises a support plate 20 which is fixed on a drive plate 10 in the disk drive, and a skew plate 30 which is superimposed on the support plate 20. A spindle motor 2 is fixed at its bottom to the upper side of the skew plate 30. An optical pickup 11 and a feeding mechanism 12 are also provided on the drive plate 10. The feeding mechanism 12 translates the optical pickup 11 in the radial direction of the disk with the help of a feeding screw 12b which receives driving force from a motor 12a.

1-2. Construction of Support Plate and Skew Plate Attachment

Referring now to FIG. 2, tapped holes 21a and 21b are formed in the support plate 20, opposing each other across the place where the spindle motor 2 is to be placed. Meanwhile, insertion holes 31a and 31b are formed in a skew plate 30, at the places corresponding to the tapped holes 21a and 21b formed in the support plate 20.

To attach the skew plate 30 to the support plate 20, guide screws 40a and 40b are provided, whose shank portions 41a and 41b being inserted through the insertion holes 31a and 31b, and end portions 42a and 42b being screwed into the tapped holes 21a and 21b. The skew plate 30 is thus loosely fitted on the support plate 20 so that the skew plate 30 can slide vertically. Between the skew plate 30 and a head portion 43a of the guide screw 40a, a helical compression spring 50a, through which the shank portion 41a of the guide screw 40a is inserted, is disposed. Similarly, between the skew plate 30 and a head portion 43b of the guide screw 40b, a helical compression spring 50b, through which the shank portion 41b of the guide screw 40b is inserted, is disposed. Accordingly, the skew plate 30 receives downward pressure from the helical compression springs 50a and 50b. The lengths of the helical compression springs 50a and 50b are set so as to satisfy the following condition. That is to leave a gap between the skew plate 30 and the support plate 20 to allow tilting of the skew plate 30, and to make the skew plate 30 receive larger load from one 50a of the helical compression springs than from the other 50b. Furthermore, settings are made so that the turntable 1 tilts around the central point of the signal-recorded area of the disk, along with the tilting of the skew plate 30.

1-3. Construction of the Support Plate

In the support plate 20, a radial-direction adjustment hole 22 is formed at a place near the tapped hole 21b and directly under line R. Through the radial-direction adjustment hole 22, a radial-direction adjuster screw 60 is screwed, applying upward force to the skew plate 30 in accordance with the depth of insertion.

Figure 5A:
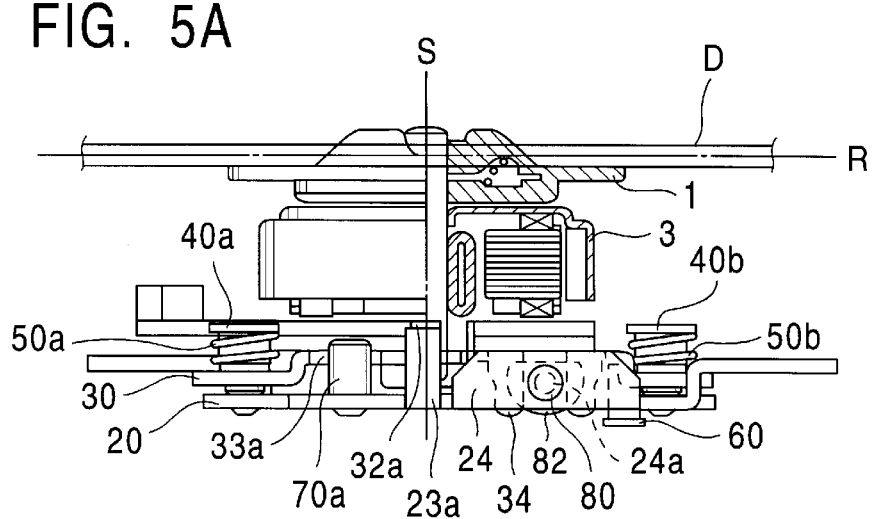
Figure 5B:
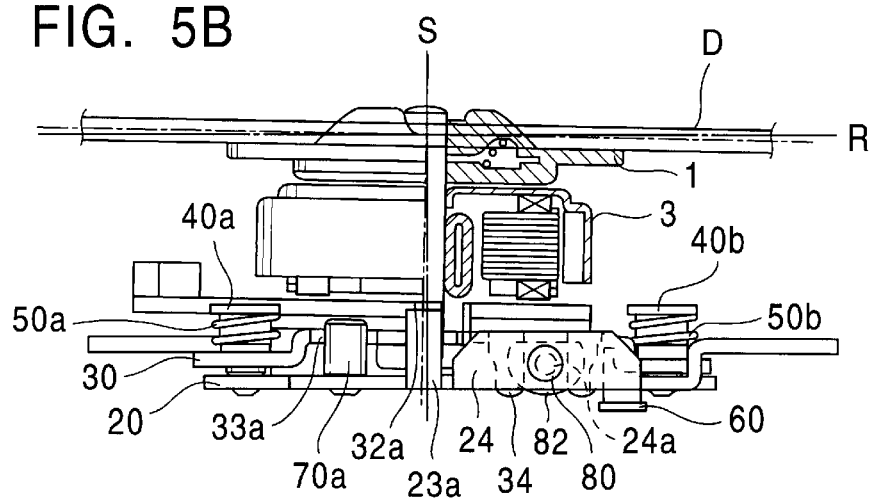
Figure 5C:
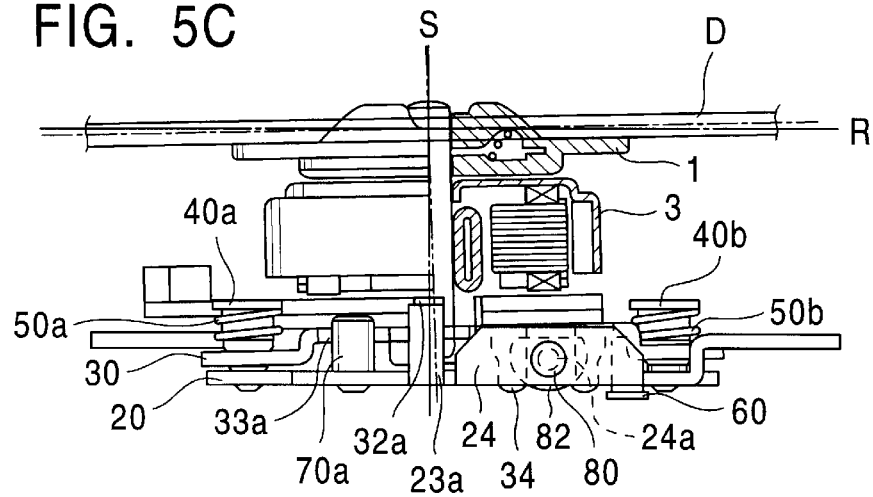
Figure 6:
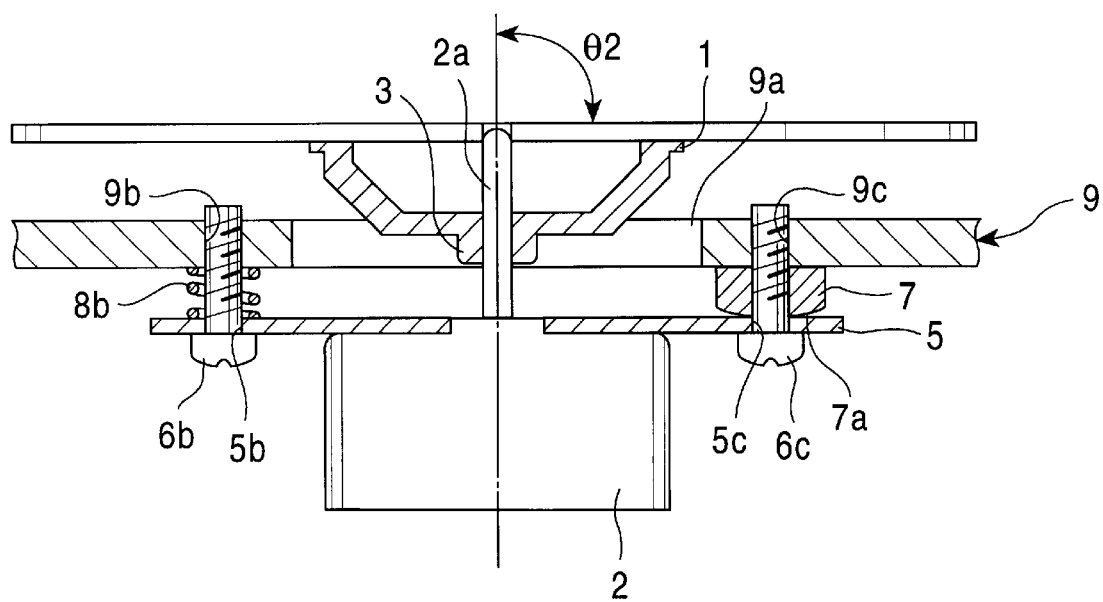
FIG. 6 is a longitudinal sectional view showing an exemplification of conventional tilt adjusting apparatuses.

The radial-direction adjuster screw 60 realizes the tilt adjustment in the radial direction. As described above, the skew plate 30 receives larger load from the helical compression spring 50a than from the helical compression spring 50b. Thus, when a depth of insertion of the radial-direction adjuster screw 60 is small, the skew plate 30 tilts in a manner that the side where the helical compression spring 50b is formed is lower than the other side, as seen in FIG. 5B. Accordingly, such initialization is made that the radial-direction adjuster screw 60 is screwed in for predetermined amount so that the skew plate 30 and the support plate 20 are parallel to each other, as seen in FIG. 5A.

The support plate 20 has two gradient portions 23a and 23b with flat upper surfaces, opposing each other across the spindle motor 2 at positions directly under line T. The gradient portions 23a and 23b are formed such that the longitudinal sectional view of which shows the upwardly widening shape. Near the gradient portions 23a and 23b, upward of them as to be seen in FIG. 3, guide pins 70a and 70b fixed are respectively in the vertical direction.

Figure 3:
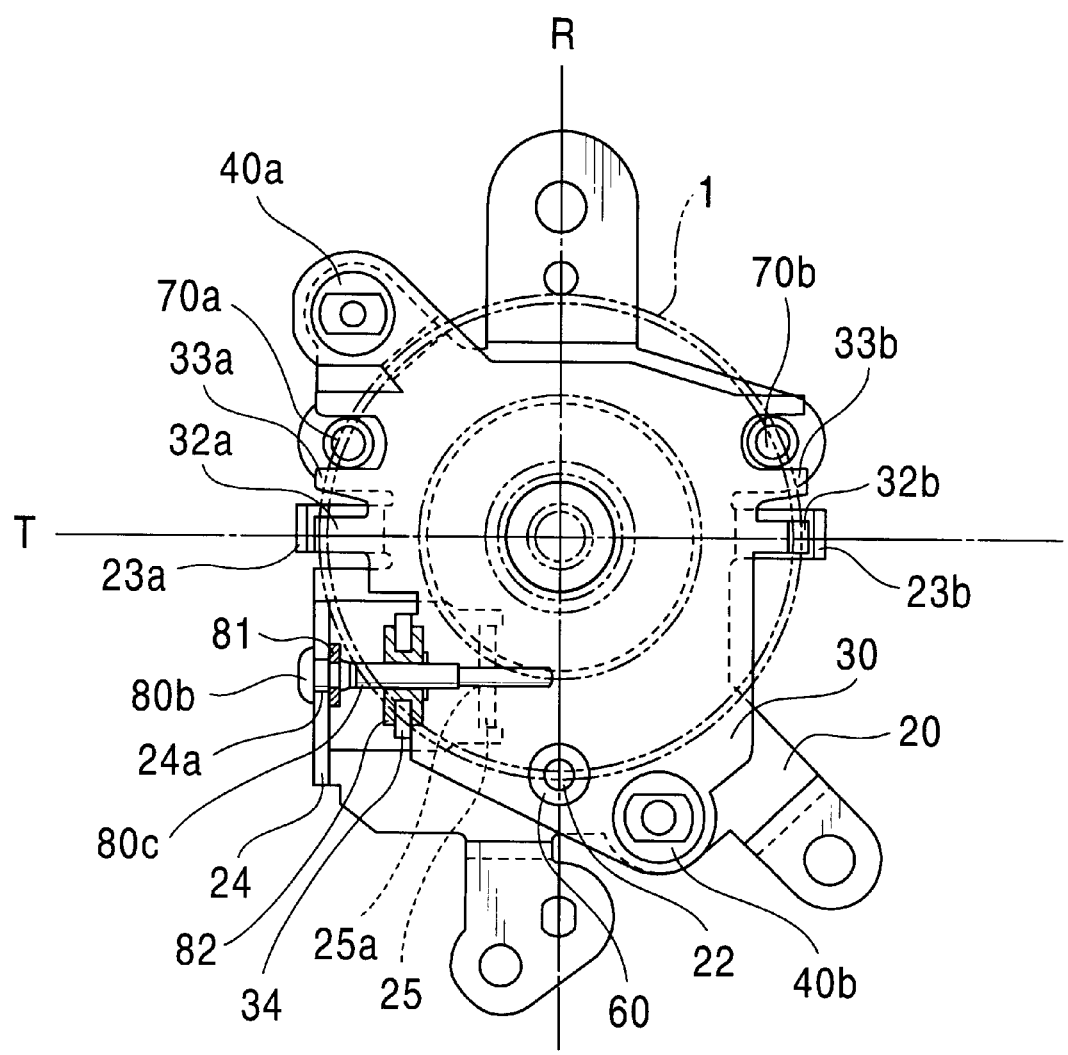
FIG. 3 is a plan view of a part of the disk drive shown in FIG. 1.

The support plate 20 also has bearings 24 and 25 near the gradient portion 23a, downward of them as to be seen in FIG. 3. The bearings 24 and 25 have shank holes 24a and 25a, through which a shank portion 80a of a tangential-direction adjuster screw 80 is inserted in the tangential direction.

The shank portion 80a is fixed with a ring 81 so that the bearing 24 is held between a head portion 80b of the tangential-direction adjuster screw 80 and the ring 81 itself. The tangential-direction adjuster screw 80 is, therefore, allowed only to rotate upon its central axis. The shank portion 80a of the tangential-direction adjuster screw 80 includes a threaded portion 80c in the middle.

1-4. Construction of Skew Plate

The skew plate 30 has bulged portions 32a and 32b at positions corresponding to the gradient portions 23a and 23b so as to abut thereon. The skew plate 30 also has grooves 33a and 33b in which the guide pins 70a and 70b are disposed respectively, so that the skew plate 30 is allowed only to slide in the tangential direction and not in the radial direction.

Additionally, a holder 34 having a shape of inverted letter-U is provided on the skew plate 30, at such position that the holder 34 bestrides the tread portion 80c of the tangential screw 80. Into the holder 34, a bush 82 having a tapped hole is loosely fitted so that the bush 82 is vertically slidable inside the holder 34. Through the tapped hole of the bush 82, the threaded portion 80c of the tangential-direction adjuster screw 80 is screwed.

(2) Operation

The tilt adjusting apparatus according to the present embodiment operates as the following description.

2-1 Adjustment of Tangential Skew

Figure 4A:
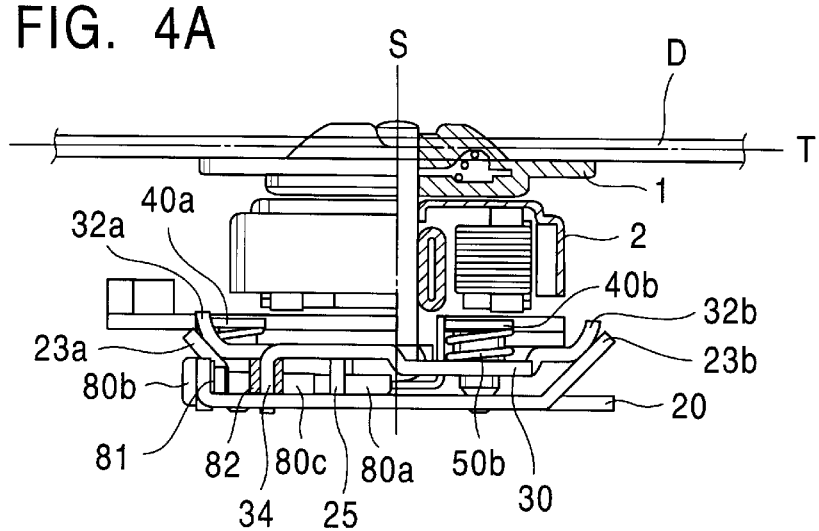
Figure 4B:
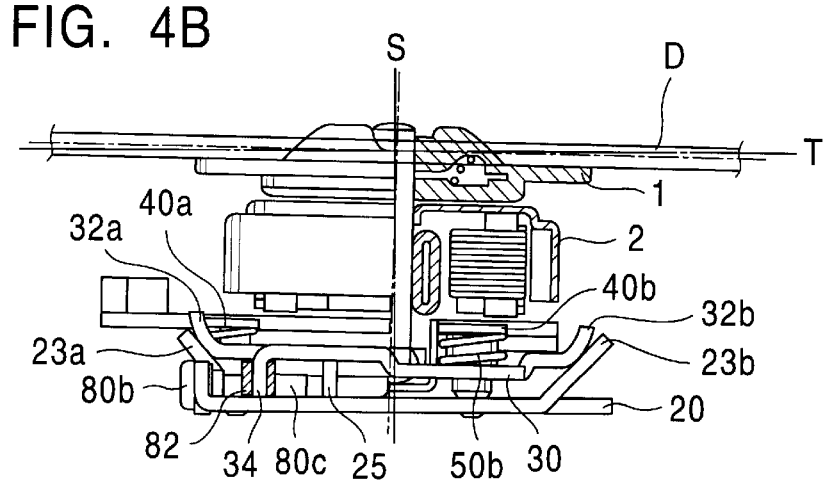
Figure 4C:
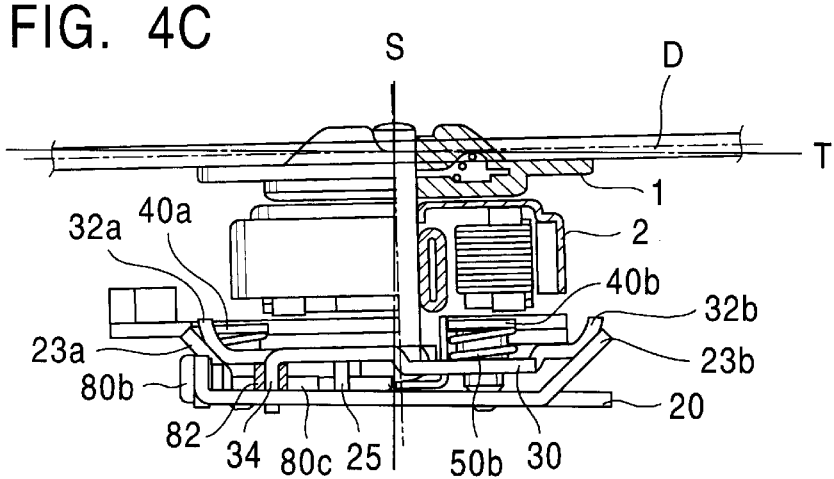

First, the method how to adjust the skew in the tangential direction will be described. Initially, the skew plate 30 and the support plate 20 are parallel to each other as seen in FIG. 4A, so that the turntable 1 is leveled. Then, when the tangential-direction adjuster screw 80 is turned, the bush 82 slides in the tangential direction, applying force to the holder 34 on the skew plate 30 in the tangential direction.

This makes the bulged portions 32a and 32b of the skew plate 30 slide while they are supported by the gradient portions 23a and 23b, so that the skew plate 30 tilts around line R. Accordingly, adjustment of the skew in the tangential direction is achieved without causing any change in the vertical position of the center of the disk. When the holder 34 is applied force to move leftward as to be seen in FIG. 4B, for example, the turntable 1 tilts in a manner that its right side lowers. Conversely, when the holder 34 is applied force to move rightward as to be seen in FIG. 4C, the turntable 1 tilts in a manner that its left side lowers.

During the above-described operation, the guide pins 70a and 70b are inserted into the grooves 33a and 33b, preventing the subtle displacement in the radial direction.

2-2. Adjustment of Radial Skew

Next, the method how to adjust the skew in the radial direction will be described. Initially, the skew plate 30 and the support plate 20 are parallel to each other as seen in FIG. 5A, so that the turntable 1 is leveled. Then, when the depth of insertion of the radial-direction adjuster screw 60 is changed, the force applied to the skew plate 30 varies.

This makes the skew plate 30 tilt around line T, while its bulged portions 32a and 32b are supported by the gradient portions 23a and 23b. Accordingly, adjustment of the skew in the radial direction is also achievable without causing any change in the vertical position of the center of the disk. When, for example, the depth of insertion of the radial-direction adjuster screw 60 is decreased as to be seen in FIG. 5B, the turntable 1 tilts in a manner that its right side lowers. Conversely, when the depth of insertion of the radial-direction adjuster screw 60 is increased as to be seen in FIG. 5C, the turntable 1 tilts so that its left side lowers.

Also during the above-described operation, the guide pins 70a and 70b are inserted into the grooves 33a and 33b, preventing the displacement in the radial direction due to the rotation of the radial-direction adjuster screw 60.

(3) Advantages

With the tilt adjustment according to the present embodiment, the disk tilts around the central point of the signal-recorded area, preventing variation in the vertical position of the center of the disk and subtle displacement in the tangential and radial direction. Accordingly, even when, for example, three spots of one main beam and two subbeams are utilized to read signals, the difference in phases of the subbbeams would not be caused; therefore, an accurate adjustment is possible. Particularly for a recent disk drive applicable for both CDs and DVDs, which employs an optical pickup comprising two lasers, two detectors, and one object lens, it is prevented that the skew adjustment for DVDs causes a difference in phases of the subbeams for CDs.

Although the present invention has been described in detail in the foregoing embodiment for the purpose of illustration, it is possible to make various modifications within the scope of the present invention. For example, a disk drive incorporating the present invention may be for both recording and playing back, or for playing back only. In addition, the present invention is applicable for apparatuses concerning any kinds or sizes of information medium as long as they have a circular shape.

What is claimed is:

1. A tilt adjusting apparatus for a disk drive having a turntable for carrying a disk, a spindle motor for revolving said turntable, an optical pickup for reading signals recorded on the disk, and a drive plate for supporting said optical pickup, said tilt adjusting apparatus comprising:

a skew plate which is fixed to or combined with said spindle motor;

a supporter unit for supporting said skew plate over said drive plate in such a manner that said skew plate is tiltable around the central point of the signal-recorded area of the disk, the skew plate includes a pair of follower portions and the supporter unit includes a pair of cam portions respectively aligned with the follower portions, the supporter unit has a guide pin and the skew plate has a groove for receiving the guide pin to limit relative movement;

a first adjuster unit for adjusting a tilt of the disk on said turntable in a first direction which is perpendicular to a tracking direction of said optical pickup, said first adjuster unit having an adjuster screw for applying force to said skew plate in a first direction;

a second adjuster unit for adjusting a tilt of the disk in a second direction by applying a force to said skew plate in a direction parallel to an axis of revolution of the disk; and restraining means for restraining said skew plate from moving in a second direction which is parallel to the tracking direction of said optical pickup, wherein a longitudinal axis of the adjuster screw is aligned approximately parallel to surfaces of the respective supporter unit and skew plate.

2. A tilt adjusting apparatus for a disk drive according to claim 1, wherein said supporter unit has at least one elastic supporting member for supporting at least one of two opposing points in said skew plate.

3. A tilt adjusting apparatus for a disk drive according to claim 1, wherein said supporter unit has at least one gradient portion which slidably supports said skew plate at the bottom.

* * * * *